United States Patent
Arff

[15] 3,670,600
[45] June 20, 1972

[54] CHAIN SAW FILING FIXTURE

[72] Inventor: Uwe F. Arff, Peterborough, Ontario, Canada

[73] Assignee: Outboard Marine Corporation, Waukegan, Ill.

[22] Filed: Aug. 26, 1970

[21] Appl. No.: 67,014

[52] U.S. Cl. ................................. 76/36, 76/25 A, 76/74
[51] Int. Cl. .......................................... B23d 63/08
[58] Field of Search ...................... 76/25 A, 36, 74, 78

[56] References Cited

UNITED STATES PATENTS

| | | | |
|---|---|---|---|
| 3,055,238 | 9/1962 | Hazzard | 76/36 |
| 3,091,136 | 5/1963 | Maier | 76/36 |
| 2,677,289 | 5/1954 | Fitch | 76/25 A UX |

*Primary Examiner*—Bernard Stickney
*Attorney*—Robert K. Gerling, Robert E. Clemency, John W. Michael, Gerrit D. Foster, Bayard H. Michael, Paul R. Puerner, Joseph A. Gemignani, Andrew O. Riteris and Spencer B. Michael

[57] ABSTRACT

Disclosed herein is a filing fixture for sharpening a saw chain, which filing fixture comprises a filing plate having first and second outer flanges extending respectively from the opposed outer edges of the filing plate and from one surface thereof and in generally perpendicular relation to the one surface. The filing plate also has, intermediate the opposed edges thereof, a channel shaped section including third and fourth flanges extending from said one filing plate surface in perpendicular relation thereto and connected by a web. In addition, the filing fixture includes a slot in each of the flanges, the slots being in alignment with one another so as to afford guidance and/or clearance of a file movable in the slots. In addition, one of the first and second flanges includes an offset portion facilitating "point" of a saw chain. Still further, one saw chain filing fixture disclosed herein includes stabilizing legs selectively locatable in collapsed or extended position.

10 Claims, 10 Drawing Figures

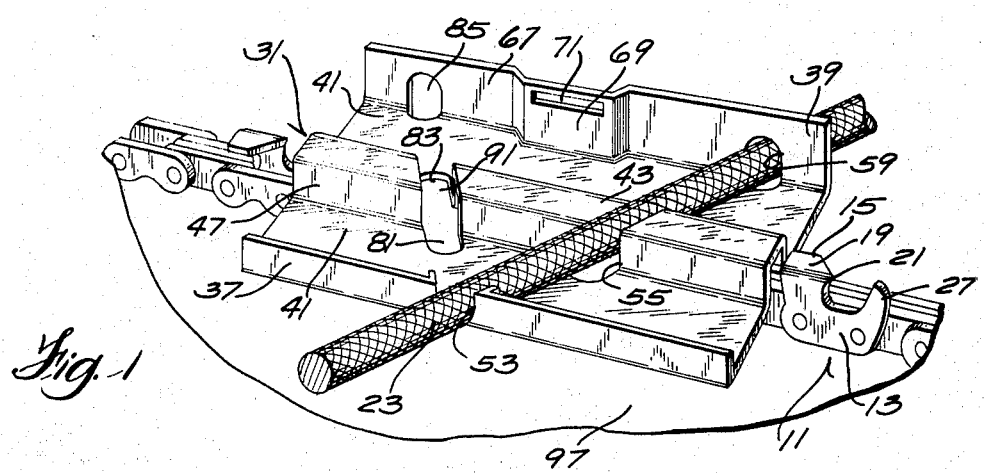
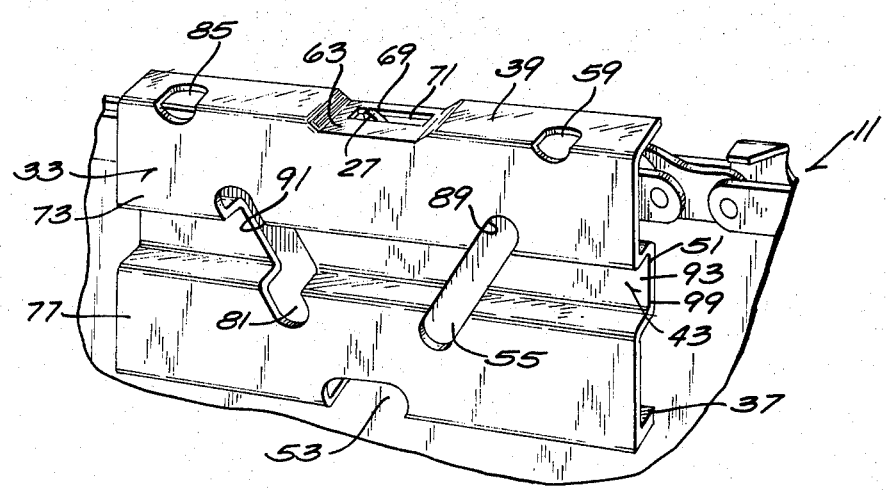
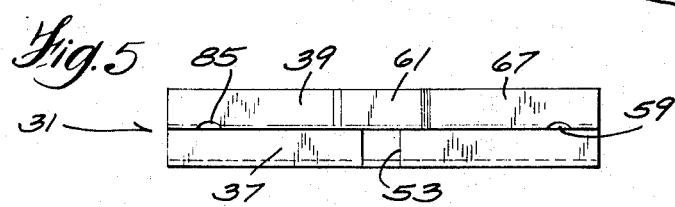
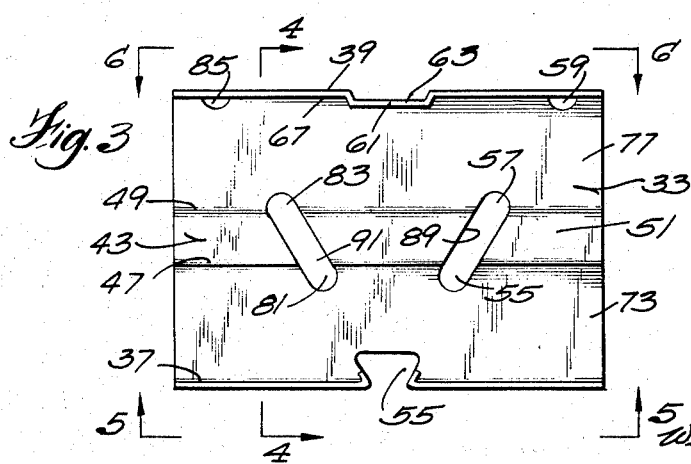
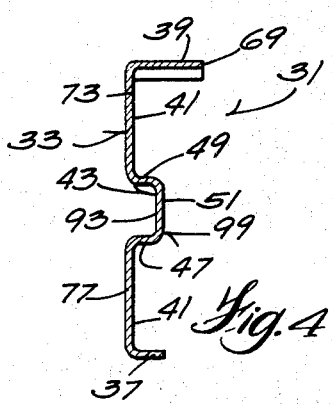

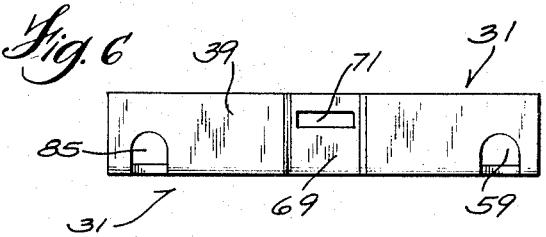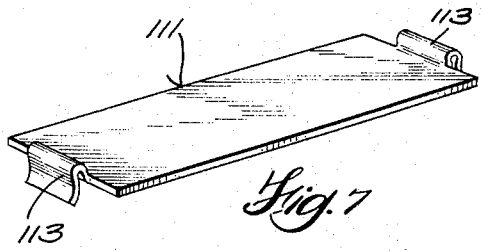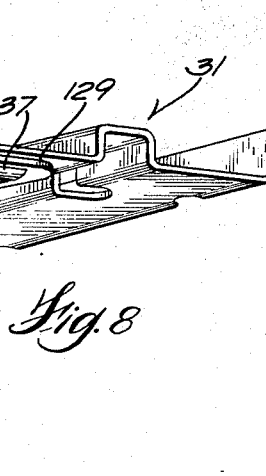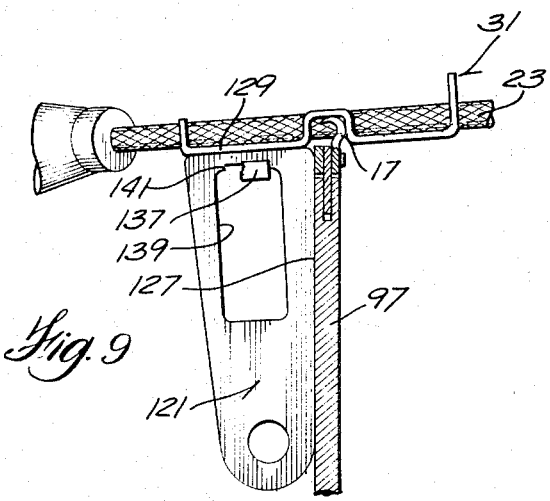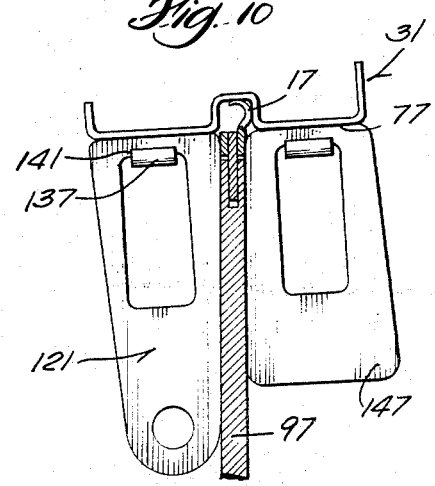

3,670,600

CHAIN SAW FILING FIXTURE

BACKGROUND OF THE INVENTION

The invention relates generally to fixtures for facilitating the sharpening of conventional saw chains of the general type such as are shown, for instance, in the U.S. Pat. No. 3,050,059, to Ricci, issued Aug. 21, 1962 and in the U.S. Pat. No. 3,329,183, to Robinson issued July 4, 1967, and in the U.S. Pat. No. 3,227,007, to Kincannon, issued Jan. 4, 1966. Such saw chains, as shown in FIGS. 1 and 2, include left and right hand cutting links 11 each including a link portion 13 and a cutting tooth portion 17 which extends from the link portion 13. The cutting tooth portion includes an upper surface 19 which, in the direction of intended travel, gradually decreases in height from the link portion 13 from the front to the rear. In addition, the top surface 19 is sometimes generally slightly inclined in the direction transverse to the direction of intended travel so that, in a right hand cutting tool, there is a slight inclination of the upper surface with the upper surface being higher from the link part along the right margin as compared to the left margin. In a left hand cutting link, the upper surface would be higher along the left margin as compared to the right margin.

The tooth portion 17 also includes, at the front thereof, a cutting edge 21 which, with respect to a right hand cutting link, extends rearwardly and to the left with respect to the direction of intended saw chain travel. The cutting edge 21 of a left hand cutting link extends rearwardly and to the right with respect to the intended direction of saw chain travel. In common practice, the cutting edge 21 is sharpened by using a round file 23 which is reciprocated transversely of the direction of intended chain travel and which removes metal from underneath the top surface 19.

Such conventional cutting links also commonly include depth gauges 27 which extend upwardly from the link portion 13 in front of the cutting portion 17 and which terminate at a height above the link portion 13 less than the height of the cutting edge 21 which is in the plane of the top surface 19. The distance above the link portion 13 between the cutting edge 21 and the top of the depth gauge 27 is commonly referred to as the "point".

Various fixtures have been proposed in the past for facilitating filing of saw chains constructed in the manner just explained. One example of such prior fixtures is disclosed in the Kincannon U.S. Pat. No. 3,227,007 issued Jan. 4, 1966. This and other prior fixtures suffered (at least as compared to the construction disclosed herein) from being relatively complicated in construction, as well as being relatively cumbersome to use.

In general, the prior art fixtures were either relatively elaborate with a wide range of adjustments to permit adaptation to varying sizes and types of saw chains or were simplified hand tools. The more elaborate fixtures were relatively bulky and not suitable for "on-the-spot" use and were generally confined to shop use. In addition, these fixtures involved time consuming set up and adjustments each time the fixture was used, which adjustments required a certain degree of skill and know-how by the operator to obtain good filing results.

The simplified tools were generally functionally inferior leaving much to be desired with respect to alignment of the file with respect to the cutting edges and usually involved visual control by the operator. Furthermore, the simplified previous filing guides were generally designed for one specific chain and some were limited to a specific make of chain.

SUMMARY OF THE INVENTION

One of the principal objects of the invention is the provision of a hardened filing guide or fixture which is of especially economical and simple construction and which can be selectively employed in two modes of operation, i.e., to sharpen the cutting edges of a saw chain and to properly "point" the saw chain.

In accordance with the invention, there is provided a filing fixture comprising a base or filing plate having at the opposite side edges thereof, respective outer flanges extending perpendicularly to one surface of the filing plate. Intermediate the outer flanges, the filing fixture is provided with a channel shaped section which is adapted to removably receive therein the top portion of the saw chain and which divides the filing plate into two spaced base portions, which channel section includes flanges extending perpendicularly to the before mentioned surface at the adjacent margins of the base portions and a web connecting the channel section flanges. Extending in generally aligned relation in each of the flanges are respective slots which serve to guide and/or to provide clearance for a file which is employed to sharpen the saw chain cutting edges.

Also in accordance with the invention, one of the outer flanges has a portion which extends outwardly beyond the web of the channel section and has a part which is offset toward the channel shaped section and apertured to permit projection therethrough of the depth gauge of a cutting link so that any deficiency in the proper "point" dimension can be corrected by filing away that portion of the depth gauge projecting through the aperture.

More particularly, the inner surface of the outer flange with the offset portion is adapted to rest on the top surface of the cutting teeth while the depth gauge projects into the aperture. The outer surface of the offset portion is spaced from the adjacent surface of the channel section at a distance less than the distance between the inner surface of the non-offset portion of the outer flange from the adjacent flange of the channel section so as to provide the proper "point". Any deficiency in the "point" distance can therefor be readily removed by filing the top of the depth gauge until the top of the depth gauge is flat with the outer surface of the offset portion.

Also in accordance with the invention, the channel flanges and one of the outer flanges are provided with second slots which are spaced from the first mentioned slots and which are aligned with one another and with the slot in the remaining outer flange so that the filing fixture is provided with two angularly related and aligned series of slots, each of which series is also in alignment with the single slot in the remaining outer flange, whereby the filing fixture is readily adapted to sharpen both right hand and left hand cutting links.

Also in accordance with the invention, the filing fixture can be provided with one or more legs which serve to increase the stability of the filing fixture when sharpening the cutting edges and which can be selectively located in a collapsed location of non-use and in a position extended with respect to the filing plate for cooperation with a cutter bar to increase the stability of the fixture for cutting edge sharpening.

Also provided in accordance with the invention is one or more spacer plates which can be readily removably secured to the filing fixture to adapt the fixture for use with the files of various diameters.

Another principal object of the invention is the provision of a filing fixture which can be adapted to be located at a selected angle with respect to the horizontal (considering the chain link portion to be vertical) so as to facilitate proper sharpening of horizontally inclined cutting edges.

Another principal object of the invention is the provision of a filing fixture which contains provision for and is selectively usable for sharpening both left and right hand cutting links without adjustment of the fixture.

Another principal object of the invention is the provision of a filing fixture or guide which does not require clamping to a cutter bar or the like and which does not involve adjustments to obtain proper results.

Still another principal object of the invention is the provision of a small relatively simple guide or fixture which can be carried in the pocket of a user and which can be stamped and formed from a single part.

Another principal object of the invention is the provision of a filing fixture or guide which automatically provides proper guidance for a file operating relative to the cutting edge for sharpening thereof and additionally provides for a recommended "point".

Still another object of the invention is the provision of a file guide having hardened surfaces along which the file may be guided, whereby to indefinitely maintain the built-in accuracy of the device.

Another principal object of the invention is the provision of a filing fixture which will provide a long and useful life due to the hardened nature of the device, which permits the operator to employ both hands on the file while sharpening saw chain cutting edges, and which can be easily carried in the pocket of a user and is adapted for use on the "site" and for use with files of differing diameters when sharpening saw chain cutting edges.

Other objects and advantages of the invention will become known by reference to the following description and accompanying drawings.

DRAWINGS

FIG. 1 is a perspective view of a saw chain filing fixture or guide which embodies various of the features of the invention and which is shown in position for filing the cutting edge of a saw chain.

FIG. 2 is a perspective view of the filing fixture shown in FIG. 1 employed for "pointing" the saw chain.

FIG. 3 is a plan view of the filing fixture shown in FIGS. 1 and 2.

FIG. 4 is a sectional view taken generally along line 4—4 of FIG. 3.

FIG. 5 is a sectional view taken generally along line 5—5 of FIG. 3.

FIG. 6 is a sectional view taken generally along line 6—6 of FIG. 3.

FIG. 7 is a perspective view of a spacer plate adapted to be employed with the filing fixture shown in FIGS. 1 through 6.

FIG. 8 is a perspective view of a filing fixture, such as shown in FIGS. 1 through 6, which is adapted to include a pair of stabilizing legs.

FIG. 9 is a sectional view of the filing fixture shown in FIG. 8.

FIG. 10 is a sectional view of still another modified filing fixture.

GENERAL DESCRIPTION

In accordance with the invention, there is shown in the drawings a tool or filing fixture or guide 31 for sharpening the cutting edges 21 of a saw chain of the general type already described. In addition, the filing fixture or guide 31 also provides for "pointing" of the cutting links 11, i.e., for reducing the height of the depth gauge 27 so as to provide the correct "point" between the top of the depth gauge 27 and the cutting edge 21. In this regard, it will be noted that sharpening of the cutting tooth portion 17 can result in a decrease in the height of the cutting edge 21 above the link portion 13 in saw chains in which the height of the top or upper surface 19 above the link portion 13 decreases rearwardly.

While various modifications can be employed, the filing guide 31 illustrated in the drawings embodies various of the features of the invention and includes a base member or filing plate 33 having first and second outer or outside flanges 37 and 39 extending respectively from the opposed outer edges or margins of one surface 41 of the filing plate 33 and in generally perpendicular relation to said one surface 41. The base member or filing plate also includes, intermediate the opposed edges thereof, a channel-shaped section 43 including third and fourth flanges 47 and 49 extending from said one base member surface 41 in perpendicular relation thereto, together with a web 51 connecting the third and fourth flanges 47 and 49 respectively.

Also in accordance with the invention, the flanges 37, 39, 47, and 49, respectively, includes at least one slot 53, 55, 57, and 59 with the flange slots being in alignment with one another. In this last regard, at least two of the slots 53, 55, 57, and 59 constitute means for guiding movement of the file 23 employed in sharpening of the cutting edges.

Also in accordance with the invention, the second outer flange 39 includes an intermediate part 61 offset toward the channel section 43 with the surface 63 of said offset part 61 remote from the channel section being closer to the channel section 43 than the surface 67 of the flange 39 adjacent to the channel section 43. In addition, the offset intermediate part 61 includes an outer portion 69 extending outwardly from the surface 41 of the base member 33 beyond the web 51 of the channel section 43 and having therein an aperture 71. As will be understood in greater detail, the aperture 71 permits projection therethrough of the upper end of the depth gauge 27 to afford removal of material therefrom by a file during the "pointing" operation.

More particularly the filing fixture or guide 31 is fabricated of hardened material so that relative sliding movement between the file 23 and the fixture 31 will not result in fixture wear. The filing plate 33 includes two portions 73 and 77 located on opposite sides of the channel section 43. In addition, the flanges 47, 49, and 39 are respectively provided with second slots 81, 83, and 85 respectively spaced from the slots 55, 57, and 59. All of the slots 53, 55, 57, 59, 81, 83, and 85 extend upwardly from the surface 41 of the filing plate so as to permit sliding movement of the file 23 along the filing plate surface 41 when performing a cutting edge sharpening operation.

In order to facilitate placement and movement of the file, the slot 53 in the flange 37 and the slots 55 and 81 in the flange 47 and the slots 57 and 83 in the flange 49 are open at the top and the slots 55 and 81 in the flange 47 respectively communicate with the slots 57 and 83 in the flange 49 through respective openings or slots 89 and 91 in the web 51 of the channel section 43. The slots 53, 55, 57, 81, and 83 preferably also extend into the adjacent margins of the filing plate portions 73 and 77. The slots 59 and 85 in the outer flange 39 can be generally circular form as shown in FIGS. 1 and 2. However, if desired, the slots 59 and 85 could also be outwardly open as are the other slots and can extend into the filing plate portion 77 as shown in FIG. 3.

When in use in a cutting edge sharpening operation, the filing plate or tool 33 is placed over the saw chain with the upper portions of the saw chain being received in the channel section 43 and with the undersurface 93 of the channel section web 51 resting on top surface 19 of a plurality of the cutting links 11. One of the margins of the slots 89 and 91 is then lined up with the cutting edge 21 to be sharpened and the file 23 is placed in one of the series of aligned slots. In this regard, the undersurface or inside surface 93 of the web 51 is spaced from the surface 41 of the filing plate at a distance which is approximately equal to the diameter of the cylindrical file 23 to be used in sharpening the cutting edges 21. Thus, in the disclosed construction, this distance is approximately three-sixteenths of an inch. Sharpening can be accomplished when using both hands on the file due to the configuration of the plate.

In order to assist in properly stabilizing the filing plate 33 relative to the saw chain, the distance between the flanges 47 and 49 of the channel section 43 is approximately the same as the greatest width of that portion of the chain received in the channel section 43.

In order that the filing plate 33 is located in parallel relation to a cutter bar 97 supporting the saw chain during the "joint" operation, the flange 37 has a height above the surface 41 equal to the height of the outer web surface 99 above the surface 41. Thus, when the tool is employed as shown in FIG. 2, the outer surface 99 of the channel section web 51 and the outer edge of the flange 37 are engaged with the cutter bar 97.

When the filing plate 31 is used in the "point" operation, the surface 67 of the flange rests upon the top surface 19 of a plurality of the cutting links 11 with the depth gauge to be "pointed" projecting through the aperture 71. In addition, the surface 99 of the web 51 and the edge of the flange 37 lie in engagement with the cutter bar. In order to afford removal of the correct amount of metal to afford the proper distance between the top of the depth gauge 27 and the cutting edge 21, the remote surface 63 of the offset part or portion 61 remote from the flange 49 of the channel section 43 is spaced from the surface 67 of the flange 39 in facing relation to the channel section flange 49 by the proper "point" distance. Thus, the application of a file to remove all of the depth gauge metal projecting above the offset surface will serve to automatically establish the proper distance of the depth gauge 27 below the cutting edge 21.

In order to accommodate the filing fixture 31 for use with saw chains having teeth which are desirably sharpened with files of smaller than, for instance, the 3/16-inch file for which the illustrated tool is especially adapted, means are provided for decreasing the height between the surface 41 of the base member 33 and the undersurface 93 of the web 51 of the channel section 43. In this regard, one or more hardened spacer plates 111 (See FIG. 7), each with spring clips 113 at the opposite ends, are provided for each of the portions 73 and 77 of the base member 33. When the spacer plates 111 are applied to the base portions 71 and 73 are retained in assembled relation by the spring clips 113, the distance from the upper or exposed surface of the assembled spacer plate 111 to the undersurface 93 of the web 51 is reduced by the thickness of the spacer plate 111 to thereby afford use of the tool 31 with files of lesser diameters. It should be noted that like spacer plates 111 should be employed with respect to both base member portions 73 and 77 when using smaller files.

In order to provide increased stability for the tool 31 when in use for sharpening the cutting edges 21, the construction shown in FIGS. 8, 9, and 10 can be employed. In addition, it should be noted that the structures shown in FIGS. 8, 9, and 10 desirably permit location of the tool at a preselected desired angle to the plane of the cutter bar 97 to obtain optimum sharpening of the cutting links 11. In this last regard, there is shown in FIGS. 8 and 9 a pair of stabilizer legs 121 which are pivotally connected to the undersurface 123 of the filing plate portion 73 by suitable means affording selective retention of the legs 121 in a collapsed storage position or in an extended position relative to the filing plate.

The legs 121 each include side edges 127 which, when the tool is mounted on a saw chain in a cutter bar 97 for cutting edge sharpening, engage the cutter bar 97 to prevent wobble of the tool 31 incident to file reciprocation. The edges 127 extend from upper or top edges 129 which, when the legs 121 are in their extended position, are in engagement with the flat undersurface 123 of the base member portion 73. Accordingly, by selection of the angle between the top edge 129 and side edge 127, the surface 41 of the filing plate or tool 31 can be suitable fixed at any angle to the cutter bar and thereby at any desired angle to the top surface 19 of the cutting link 11 to be sharpened.

While various arrangements can be employed to pivotally connect the stabilizer legs 121 to the filing plate 31 and to permit selective retention of the legs 121 in retracted and extended positions, in the disclosed construction, such means comprises a double ended leaf spring 131 which, intermediate its ends, is suitably connected to the filing plate undersurface 123, as for instance, by rivets 133 and which, at its ends, has cup-shaped portions 137 extending into apertures or openings 139 in the respective legs 121 to alternately hold the legs in extended or retracted position. Preferably, the upper margins of the openings 139 have notches 141 which receive the cup-shaped leaf spring portions 139 in such manner as to prevent movement of the stabilizer legs 121 relative to the filing plate 31 in the direction generally perpendicular to the cutter bar 97. While it is preferred to employ two such stabilizer legs 121, it is within the invention to employ a single leg beneath the filing plate portion 73.

If desired, as shown in FIG. 10, one or more additional stabilizer legs 147 can be employed underneath the filing plate portion 77. In the disclosed construction, as shown in FIG. 10, it is contemplated to use two such legs 147 which are connected to the filing plate 31 and movable relative to the filing plate 31 in like manner to the stabilizing legs 121.

Various of the features of the invention are set forth in the following claims.

What is claimed is:

1. A filing fixture for sharpening a saw chain, said fixture comprising a filing plate having first and second flanges extending respectively from the opposed edges of said filing plate and from one surface thereof and in generally transverse relation to said one surface, said filing plate also having, intermediate the opposed edges thereof, a channel shaped section including third and fourth flanges extending from said one filing plate surface in perpendicular relation thereto, and a web connecting said third and fourth flanges, and a slot in each of said flanges, said slots being in alignment with one another.

2. A filing fixture in accordance with claim 1 wherein at least two of said slots constitute means for guiding movement of a file.

3. A filing fixture in accordance with claim 1 wherein at least two of said slots constitute means for guiding movement of a file and wherein at least one of said slots affords clearance for file movement guided by said file guiding means.

4. A filing fixture in accordance with claim 1 wherein said web includes an opening communicating with said slots in said third and fourth flanges.

5. A filing fixture in accordance with claim 1 wherein said slots extend in said flanges from said filing plate.

6. A filing fixture in accordance with claim 1 and further including second slots in each of said second, third and fourth flanges respectively spaced from said first mentioned slots in said second, third, and fourth flanges, said second slots in said second, third, and fourth flanges being in alignment with each other and with said slot in said first flange.

7. A filing fixture in accordance with claim 1 wherein one of said first and second flanges has an intermediate part offset toward said channel section with the surface of said offset part remote from said channel section being closer to said channel section than the surface of said one first flange adjacent to said channel section, said intermediate part including a portion extending outwardly from said one surface of said base member beyond said web of said channel section and having therein an aperture.

8. A filing fixture in accordance with claim 1 including a removable plate having at the ends thereof means for removably fixing said plate to one portion of said filing plate so that the distance between the top surface of said removable plate when connected to said plate member and the inside surface of said web is less than the distance between said plate member and the inside surface of said web.

9. A filing fixture in accordance with claim 1 including a leg member having an edge and means for detachably connecting said leg member to said filing plate with said edge extending at a predetermined angle with respect to said filing plate.

10. A filing fixture in accordance with claim 9 wherein said angle locates said filing plate in a plane parallel to a top surface of said saw chain.

* * * * *